US012664924B2

(12) United States Patent
Kim

(10) Patent No.: US 12,664,924 B2
(45) Date of Patent: Jun. 23, 2026

(54) DISPLAY DEVICE AND METHOD OF DRIVING SAME

(71) Applicant: LG Display Co., Ltd., Seoul (KR)

(72) Inventor: Minhoi Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/984,359

(22) Filed: Dec. 17, 2024

(65) Prior Publication Data

US 2025/0265962 A1 Aug. 21, 2025

(30) Foreign Application Priority Data

Feb. 19, 2024 (KR) ........................ 10-2024-0023598

(51) Int. Cl.
*G09G 3/20* (2006.01)

(52) U.S. Cl.
CPC ... *G09G 3/2092* (2013.01); *G09G 2310/0275* (2013.01); *G09G 2310/08* (2013.01); *G09G 2330/021* (2013.01)

(58) Field of Classification Search
CPC ......... G09G 3/2092; G09G 2310/0275; G09G 2310/08; G09G 2330/021
See application file for complete search history.

(56) References Cited

U.S. PATENT DOCUMENTS 10,249,258 B2 * 4/2019 Park ..................... G09G 3/2092
2009/0167750 A1 * 7/2009 Hong ................... G09G 3/2096 345/213
2024/0403257 A1 * 12/2024 Zhang ................. G06F 13/4022

FOREIGN PATENT DOCUMENTS

WO WO-2023108461 A1 * 6/2023 ......... G06F 13/4022

* cited by examiner

*Primary Examiner* — Ke Xiao
*Assistant Examiner* — Jennifer L Zubajlo
(74) *Attorney, Agent, or Firm* — Birch, Stewart, Kolasch & Birch, LLP

(57) ABSTRACT

A display device in one example includes a display panel having pixels disposed therein, a timing controller configured to output an embedded clock P-P interface (EPI) data including an EPI clock, control data, and image data through one or more EPI line pairs, and a data driver connected to the timing controller through the one or more EPI line pairs. The data driver is configured to generate an internal clock based on the EPI clock, process the control data and the image data, and supply data voltages to the pixels. The timing controller changes a frequency of the EPI clock according to a driving frequency controlled by a host system. A method of driving the display device is also discussed.

18 Claims, 9 Drawing Sheets

DISPLAY DEVICE AND METHOD OF DRIVING SAME

CROSS-REFERENCE TO RELATED APPLICATION

The present application claims priority to Korean Patent Application No. 10-2024-0023598, filed in the Republic of Korea on Feb. 19, 2024, the entire contents of which is hereby expressly incorporated by reference into the present application.

BACKGROUND

Field

The present disclosure relates to a display device and a method of driving the same.

Discussion of the Related Art

As the information society develops, various demands for display devices for displaying images are increasing, and various types of display devices such as liquid crystal displays (LCDs) and organic light emitting diode (OLED) displays are utilized.

Images displayed on a display device can be still images or moving images, and the moving image can include various types such as sports images, game images, and movies. The display device is driven in a variable refresh rate (VRR) mode in which a driving frequency varies depending on the type of an image, thereby reducing power consumption and extending the lifetime of the display device.

SUMMARY OF THE DISCLOSURE

Embodiments of the present disclosure are directed to providing a display device for adaptively changing an embedded clock P-P interface (EPI) pair option and an inner clock according to a driving frequency upon low-frequency driving, and a method of driving the same.

The embodiments of the present disclosure are also directed to providing a display device for predicting a refresh rate in real time and setting an optimal EPI pair option and an inner clock for an active period and a vertical blank period, and a method of driving the same.

A display device according to one or more embodiments of the present disclosure can include a display panel having pixels disposed therein, a timing controller configured to output an embedded clock P-P interface (EPI) data including an EPI clock, control data, and image data through one or more EPI line pairs, and a data driver connected to the timing controller through the one or more EPI line pairs and configured to generate an internal clock based on the EPI clock, process the control data and the image data, and supply data voltages to the pixels.

According to aspects of the present disclosure, the timing controller can change a frequency of the EPI clock according to a driving frequency controlled by a host system.

According to aspects of the present disclosure, the timing controller can increase the frequency of the EPI clock when the driving frequency increases, and decrease the frequency of the EPI clock when the driving frequency decreases.

According to aspects of the present disclosure, the timing controller can change the frequency of the EPI clock to be lower than a frequency for an active period in one frame for a vertical blank period in the one frame.

According to aspects of the present disclosure, for the active period, the timing controller can determine a length of one horizontal period based on a pulse cycle of a data enable signal transmitted from the host system, determine the frequency of the EPI clock to correspond to a length of the one horizontal period, and transmit the determined frequency of the EPI clock to the data driver.

According to aspects of the present disclosure, for the vertical blank period, the timing controller can transmit the EPI clock at an ultra-low frequency lower than the determined frequency for the active period to the data driver.

According to aspects of the present disclosure, the timing controller can set a bit value of a data bit to correspond to a pulse period of each of a reference clock, and change the frequency of the EPI clock by generating the EPI clock at a logic level corresponding to the set bit value.

According to aspects of the present disclosure, the one or more EPI line pairs can include a first EPI line pair and a second EPI line pair, and the timing controller can change the number of EPI line pairs transmitting the EPI data to the data driver according to the driving frequency.

According to aspects of the present disclosure, the timing controller can decrease the number of EPI line pairs when the driving frequency increases, and increase the number of EPI line pairs when the driving frequency decreases.

According to aspects of the present disclosure, the timing controller can transmit the EPI clock at a predetermined unlock frequency to the data driver when the driving frequency is changed, and transmit the EPI data through the selected number of EPI line pairs according to the driving frequency when receiving a lock signal at a logic low level from the data driver.

According to aspects of the present disclosure, when the driving frequency is changed, the timing controller can transmit a line pair selection signal for instructing the number of EPI line pairs and a line pair change signal for instructing a change in EPI line pair to the data driver, and the data driver can set line pair options based on the line pair selection signal and the line pair change signal.

According to aspects of the present disclosure, the line pair selection signal can be defined to instruct the number of EPI line pairs through which the timing controller and the data driver transmit and receive the EPI data as 2 bit data.

According to aspects of the present disclosure, the line pair change signal can be switched to a logic high level when the number of EPI line pairs is changed.

A method of driving a display device including a timing controller and a data driver connected through one or more embedded clock P-P interface (EPI) line pairs according to one or more embodiments of the present disclosure can include determining, by the timing controller, a length of one horizontal period based on a pulse cycle of a data enable signal transmitted from a host system for an active period in one frame, changing a frequency of an EPI clock to correspond to the length of the one horizontal period, transmitting the EPI clock of the changed frequency to the data driver, and generating, by the data driver, an internal clock based on the EPI clock.

According to aspects of the present disclosure, when the driving frequency increases, the frequency of the EPI clock can increase, and when the driving frequency decreases, the frequency of the EPI clock can decrease.

According to aspects of the present disclosure, the method can further include generating the EPI clock of an ultra-low frequency lower than a frequency for the active period for a vertical blank period in the one frame, and transmitting the EPI clock of the ultra-low frequency to the data driver.

According to aspects of the present disclosure, the changing of the frequency of the EPI clock can include setting a bit value of a data bit to correspond to a pulse cycle of each of a reference clock, and generating the EPI clock of a logic level corresponding to the set bit value.

According to aspects of the present disclosure, the one or more EPI line pairs can include a first EPI line pair and a second EPI line pair, and the changing of the frequency of the EPI clock can include changing the number of EPI line pairs transmitting EPI data to the data driver according to the driving frequency.

According to aspects of the present disclosure, when the driving frequency increases, the number of EPI line pairs can decrease, and when the driving frequency decreases, the number of EPI line pairs can increase.

According to aspects of the present disclosure, the changing of the number of EPI line pairs can include transmitting, by the timing controller, the EPI clock of a predetermined unlock frequency to the data driver, transmitting, by the data driver, a lock signal of a logic low level to the timing controller in response to the EPI clock, and transmitting, by the timing controller, the EPI data to the data driver through the number of EPI line pairs selected according to the driving frequency when the lock signal of the logic low level is confirmed.

BRIEF DESCRIPTION OF THE DRAWINGS

The present disclosure will become more fully understood from the detailed description given hereinbelow and the accompanying drawings which are given by way of illustration only, and thus are not limitative of the present disclosure.

DETAILED DESCRIPTION OF THE EMBODIMENTS

Figure 1:
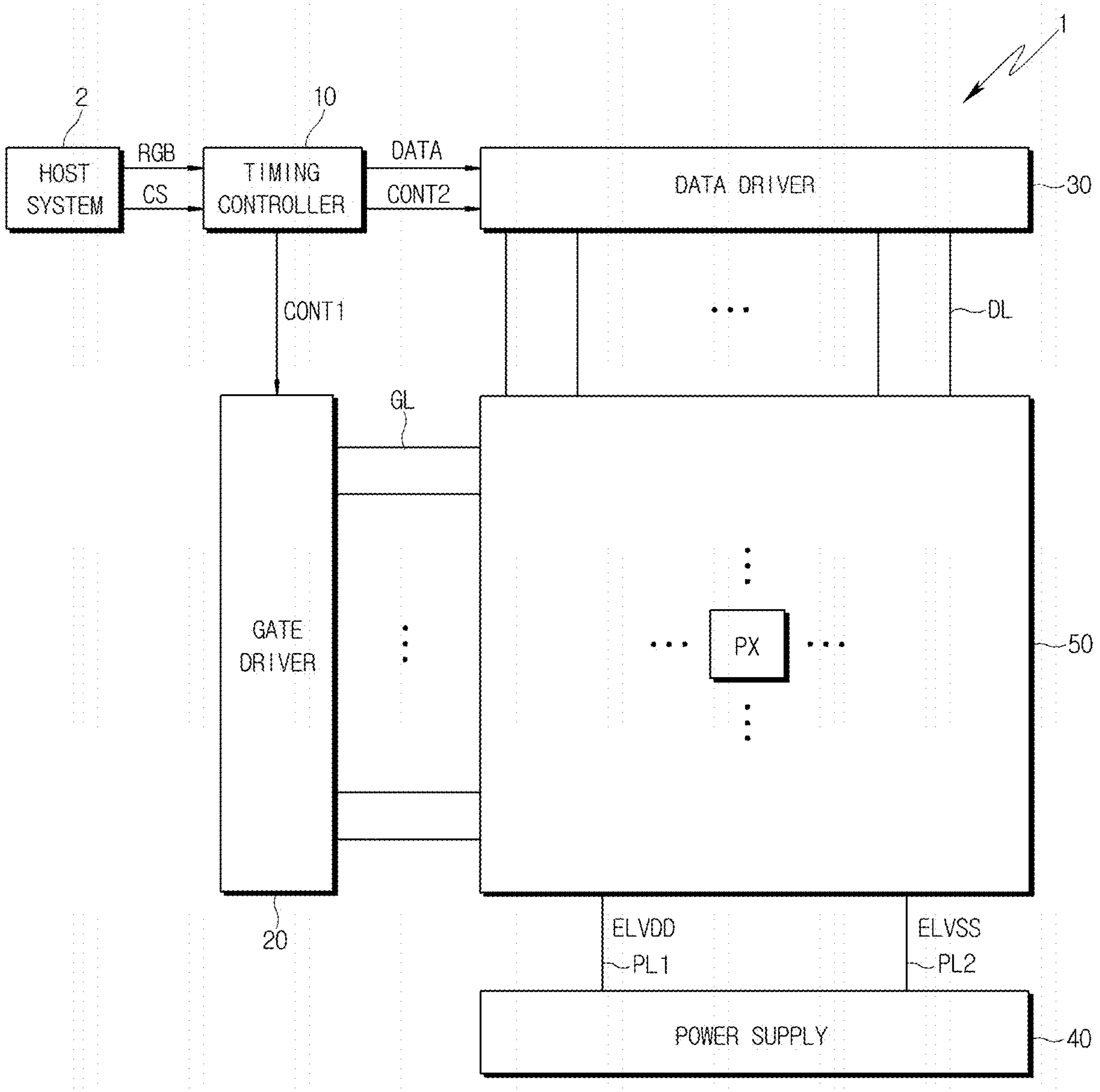
FIG. 1 is a block diagram schematically showing a structure of a display device according to one embodiment of the present disclosure.

Hereinafter, embodiments of the present disclosure will be described with reference to the accompanying drawings. In the specification, when a first component (or an area, a layer, a portion, or the like) is described as "on," "over," "above," "connected," or "coupled to" a second component, it means that the first component can be directly connected/coupled to the second component or one or more third/other components can be disposed therebetween.

The same reference numerals indicate the same or similar components. In addition, in the drawings, thicknesses, proportions, and dimensions of components are exaggerated for effective description of technical contents. The term "and/or" includes all one or more combinations that can be defined by the associated configurations.

Terms such as "first" and "second" can be used to describe various components, but the components are not limited by the terms. The terms are used only for the purpose of distinguishing one component from another, and may not define order or sequence. For example, a first component can be referred to as a second component, and similarly, the second component can also be referred to as the first component without departing from the scopes of the embodiments. The singular expression includes the plural expression unless the context clearly dictates otherwise.

Terms such as "under," "at a lower side," "above," and "at an upper side" are used to describe the relationship between the components illustrated in the drawings. The terms are relative concepts and are described with respect to directions marked in the drawings.

It should be understood that term such as "includes" or "has" is intended to specify the presence of features, numbers, steps, operations, components, parts, or a combination thereof described in the specification and does not preclude the presence or addition possibility of one or more other features, numbers, steps, operations, components, parts, or combinations thereof in advance.

Further, the term "can" fully encompasses all the meanings and coverages of the term "may."

Features of various embodiments of the present disclosure can be partially or entirely coupled to or combined with each other and can be operated, linked, or driven together in various ways. Embodiments of the present disclosure can be carried out independently from each other, or can be carried out together in co-dependent or related relationship.

All the components of each display device or apparatus according to all embodiments of the present disclosure are operatively coupled and configured. Further, any method, process, operation or step discussed herein can be implemented in any display device or system, or part thereof, discussed herein according to all embodiments of the present disclosure.

FIG. 1 is a block diagram schematically showing a structure of a display device according to one embodiment of the present disclosure.

Referring to FIG. 1, a display device 1 includes a timing controller 10, a gate driver 20, a data driver 30, a power supply 40, and a display panel 50.

The timing controller 10 can receive image signals RGB and a control signal CS from an external host system 2 or the like. The image signals RGB can include a plurality of grayscale data. The control signal CS can include, for example, a vertical synchronization signal, a horizontal synchronization signal, a data enable signal, and the like.

One frame of the display device 1 can be defined by the vertical synchronization signal and the data enable signal, and an active period and vertical blank period in one frame can be defined. Specifically, one frame can be defined as an interval between adjacent pulses (e.g., a pulse cycle) of the vertical synchronization signal. The active period is a display driving period in which images are displayed and can be defined as a section (e.g., a pulse section) in which the data enable signal transitions between logic high and logic low in one frame. The vertical blank section can be defined as a section in which the data enable signal is maintained at logic low, for example, a non-transition section in one frame.

In addition, one horizontal period in one frame can be defined by the data enable signal. Specifically, in the pulse section of the data enable signal, one horizontal period can be defined as an interval (e.g., a pulse cycle) of adjacent pulses of the data enable signal. The one horizontal period can include a logic high section in which image data DATA is applied from the timing controller 10 to the data driver 30 and a logic low section in which the image data DATA is not applied, for example, a horizontal blank section.

In one embodiment of the present disclosure, a length of the vertical blank period can be changed by the vertical synchronization signal and the data enable signal. The host system 2 can operate in a variable refresh rate mode in which a frame frequency (e.g., a refresh rate) is changed for driving by changing the length of the vertical blank period based on the complexity of the input image signals RGB, a change between frames of the image signals RGB, and the like. When the image signals RGB are complex and the change between the frames is large, the host system 2 can reduce a refresh rate by extending the length of the vertical blank period belonging to each frame. When the length of the vertical blank section in one frame is changed, a temporal length and refresh rate of one frame can be changed.

When the display device 1 is driven at a rate lower than a reference refresh rate, it can be referred to as "low-frequency driving" or "low-speed driving," and when the display device 1 is driven at a rate higher than the reference refresh rate, it can be referred to as "high-frequency driving" or "high-speed driving." The refresh rate can be determined according to the type of image being displayed or the like, but is not limited thereto.

The gate driver 20 can generate gate signals based on a gate drive control signal CONT1 output from the timing controller 10. The gate driver 20 can provide the generated gate signals to pixels PX through a plurality of gate lines GL. In one embodiment of the present disclosure, one pixel PX can be configured to receive a plurality of gate signals with different waveforms. In the embodiment, the gate driver 20 can provide the plurality of gate signals to the pixels PX through the corresponding gate lines GL.

The gate driver 20 can be configured in a form of a gate in panel mounted on the display panel 50. The gate driver 20 can be disposed at one side of the display panel 50 or both sides (e.g., a left or right side) of the display panel 50 as shown. According to a driving method, a panel design method, and the like, the gate driver 20 can be disposed at both sides (e.g., left and right sides) of the display panel 50 as shown or connected to two or more of four side surfaces of the display panel 50.

The data driver 30 can generate data voltages based on the image data DATA and a data drive control signal CONT2 output from the timing controller 10. The data driver 30 can provide the generated data voltages to the pixels PX through a plurality of data lines DL.

The poser supply 40 can generate a high potential driving voltage ELVDD and a low potential driving voltage ELVSS to be provided to the display panel 50. The poser supply 40 can provide the generated driving voltages ELVDD and ELVSS to the pixels PX through the corresponding voltage lines PL1 and PL2.

A plurality of pixels PX (or referred to as sub-pixels) are disposed on the display panel 50. For example, the pixels PX can be arranged in a form of a matrix on the display panel 50. Pixels PX disposed in one pixel row are connected to the same gate line GL, and pixels PX disposed in one pixel column are connected to the same data line DL. The pixels PX can emit light with brightness corresponding to the data voltage supplied through the data lines DL in response to the gate signal applied through the gate line GL. As a variation, each pixel PX can include a plurality of sub-pixels.

In one embodiment of the present disclosure, each pixel PX can display one of red, green, and blue. In another embodiment of the present disclosure, each pixel PX can display one of cyan, magenta, and yellow. In various embodiments, each pixel PX can display one of red, green, blue, and white.

The timing controller 10, the gate driver 20, the data driver 30, and the power supply 40 can each be configured as a separate integrated circuit (IC) or at least a partially integrated IC.

Figure 2:
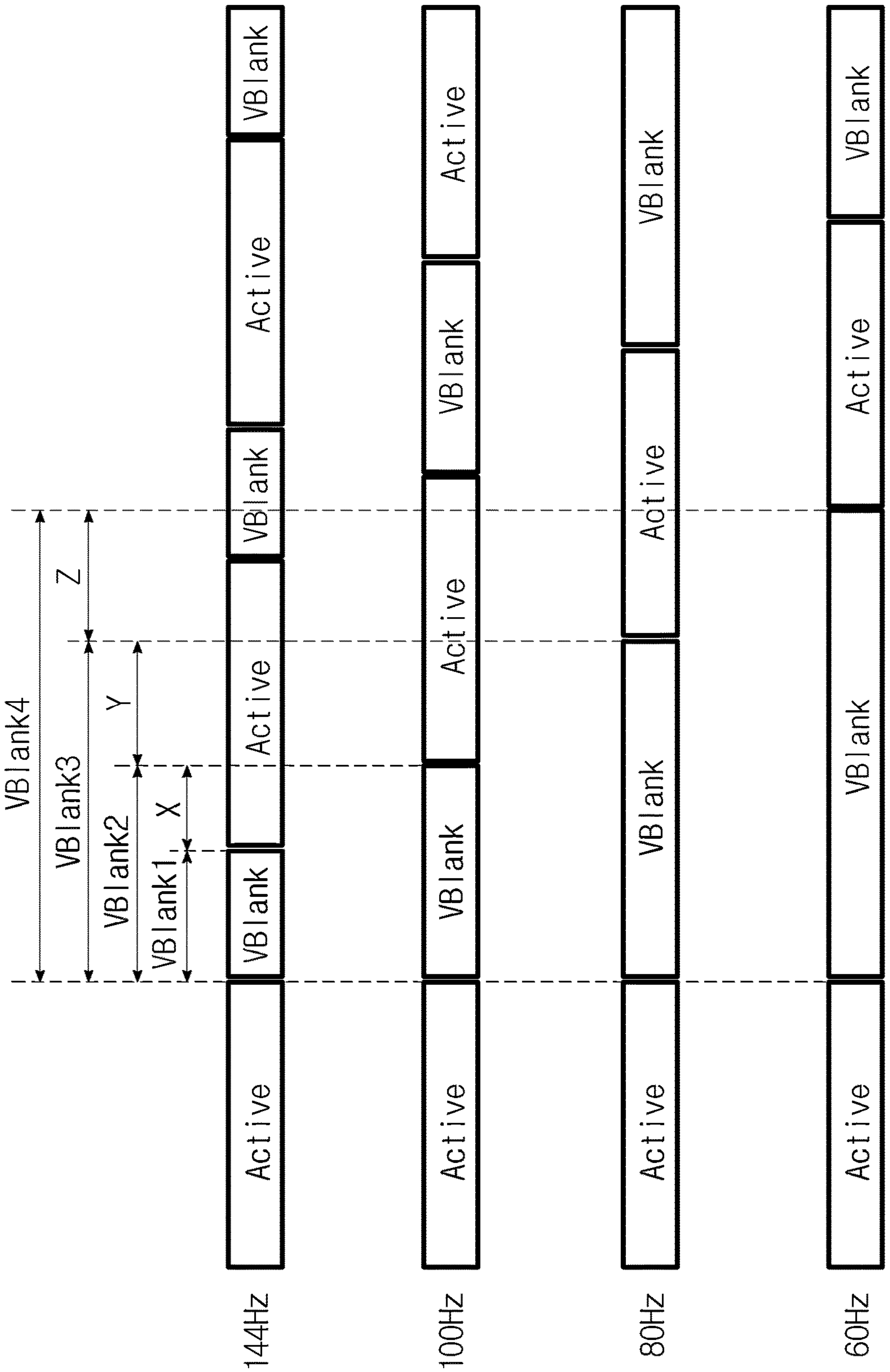
FIG. 2 is a view showing a method of driving the display device according to one embodiment of the present disclosure.

FIG. 2 is a view showing a method of driving the display device according to one embodiment of the present disclosure.

Referring to FIG. 2, in a variable refresh rate mode, one frame can include an active period Active and a vertical blank period VBlank. For the active period Active, each pixel PX can be programmed to a new data voltage, and the light emitting element of the pixel PX can emit light in response to the programmed data voltage. For the vertical blank period VBlank, each pixel PX can emit light in response to the data voltage programmed for the active period Active. In one embodiment, for the vertical blank period VBlank, a characteristic value of the pixel PX can be sensed, and the data voltage can be compensated according to the result of sensing.

In the embodiment, the host system 2 can change the frame frequency by changing the length of the vertical blank period VBlank (e.g., the length of the non-transition period of the data enable signal) in consideration of rendering times of the image signals RGB. Specifically, the length of the vertical blank period VBlank can be larger as the refresh rate is lower and can be smaller as the refresh rate is higher.

For example, as shown, the host system 2 can set the length of the vertical blank period to "VBlank1" when implementing a 144 Hz mode and adjust the length of the non-transition section of the data enable signal to correspond to "VBlank1." When implementing a 100 Hz mode, the host system 2 can set the length of the vertical blank period to "VBlank2" increased by "X" compared to "VBlank1" and adjust the length of the non-transition section of the data enable signal to correspond to "VBlank2." When implementing an 80 Hz mode, the host system 2 can set the length of the vertical blank period to "VBlank3" increased by "Y" compared to "VBlank1" and adjust the length of the non-transition section of the data enable signal to correspond to "VBlank3." When implementing a 60 Hz mode, the host system 2 can set the length of the vertical blank period to "VBlank4" increased by "Z" compared to "VBlank1" and adjust the length of the non-transition section of the data enable signal to correspond to "VBlank4."

Figure 3:
FIG. 3 is a view showing a connection relationship between a timing controller and a data driver of a display device according to one embodiment of the present disclosure.
Figure 4:
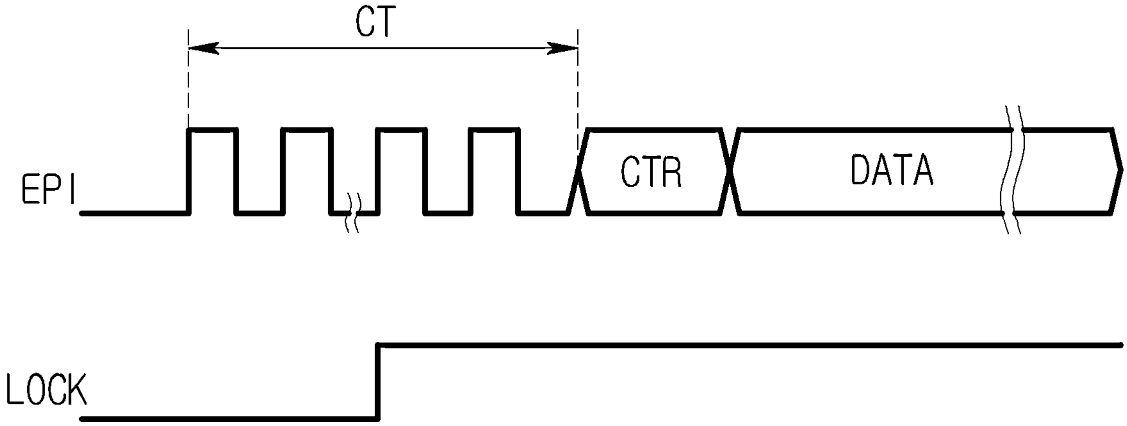
FIG. 4 is a view showing signals transmitted and received between the timing controller and the data driver in FIG. 3.

FIG. 3 is a view showing a connection relationship between a timing controller and a data driver of the display device according to one embodiment of the present disclosure. FIG. 4 is a view showing signals transmitted and received between the timing controller and the data driver in FIG. 3.

Referring to FIG. 3, the data driver 30 can be connected to the timing controller 10 through one or more EPI line pairs EPI0 and EPI1 which follow an EPI interface protocol. In FIG. 3, although two EPI line pairs EPI0 and EPI1 are shown as an example, the present embodiment of the present disclosure is not limited thereto, and the timing controller 10 and the data driver 30 can be connected through a larger number of EPI line pairs.

In one embodiment, the timing controller 10 can transmit EPI data to the data driver 30 using one or more of the plurality of EPI line pairs EPI0 and EPI1. For example, in high frequency driving, the timing controller 10 can transmit the EPI data to the data driver 30 through the first EPI line pair EPI0. In addition, in low-frequency driving, the timing controller 10 can transmit the EPI data to the data driver 30 through the first and second EPI line pairs EPI0 and EPI1. In other words, in the low-frequency driving, a frequency of the EPI data is low, but by increasing the number of line pairs which are EPI transmission paths, the total amount of EPI data transmitted for the same time can be maintained.

Referring to FIG. 4, the timing controller 10 can convert a clock training pattern CT including an EPI clock, control data CTR, image data DATA, and the like into differential signals according to the signal transmission standard defined in the EPI interface protocol and serially transmit the differential signals to the data driver 30 through one or two or more data line pairs EPI0 and EPI1.

Specifically, the timing controller 10 transmits the clock training pattern CT (e.g., the EPI clock) before transmitting the control data CTR and the image data DATA to the data driver 30.

The data driver 30 can include a clock recovery circuit for clock and data recovery (CDR). The clock recovery circuit can generate an internal clock based on the EPI clock transmitted through the EPI line pairs. When a phase and frequency of the internal clock are stably fixed, the data driver 30 transmits a lock signal LOCK at a logic high level to the timing controller 10 through a lock feedback signal line LL. Therefore, a data link for data transmission and reception can be established between the timing controller 10 and the data driver 30.

When the phase and frequency of the clock recovery circuit of the data driver 30 are unlocked, the data driver 30 inverts the lock signal LOCK to a logic low level. The timing controller 10 can transmit the EPI clock back to the data driver 30 in response to the lock signal LOCK at the logic low level, and the data driver 30 can resume clock training.

When the data link is established, the timing controller 10 can transmit the control data CTR and the image data DATA to the data driver 30.

The control data CTR is a data driving control signal CONT2 and can include information indicating the start of the control data CTR, information indicating a start location of the image data DATA, information indicating a rising time and pulse width of a source output enable signal, information indicating an option (e.g., an equalizing level or resistance) for the data packet transmitted to the data driver 30. In addition, the control data CTR can further include information for controlling various functions which can be implemented in the data driver 30.

The image data DATA can include a plurality of grayscale data corresponding to images to be displayed.

As described above with reference to FIG. 2, when the driving frequency of the display device 1 is changed, the timing controller 10 can variably control the frequency of the EPI clock. For example, when the display device 1 operates at a low frequency, the timing controller 10 can implement low-power driving by controlling the frequency of the EPI clock to decrease in a relatively longer vertical blank period than that at a high frequency.

Detailed description thereof will be made below.

Figure 5:
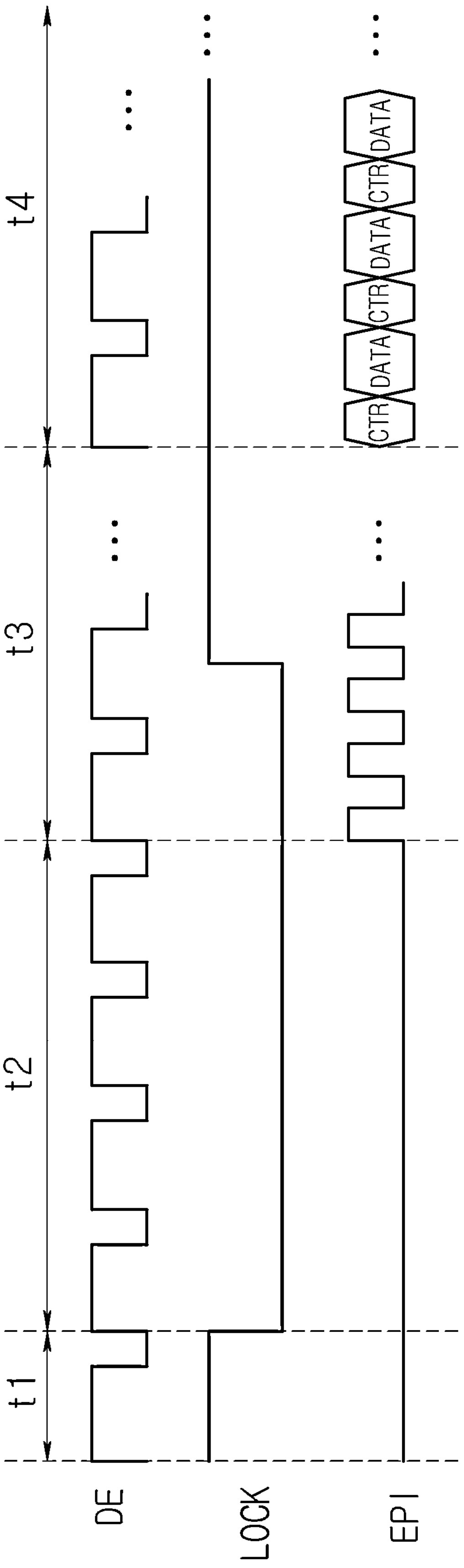
FIG. 5 is a view showing signals transmitted or received between the timing controller and the data driver for an active period according to one example of the present disclosure.
Figure 6:
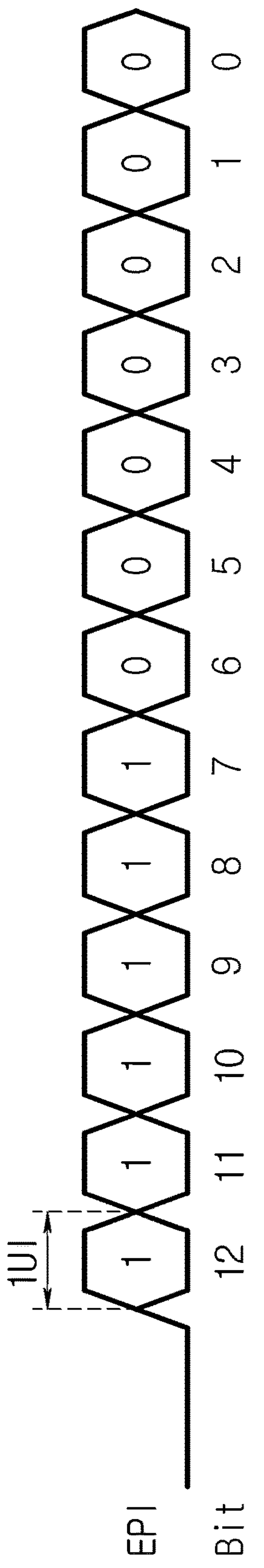
FIG. 6 is a view showing a clock packet according to one example of the present disclosure.
Figure 7:
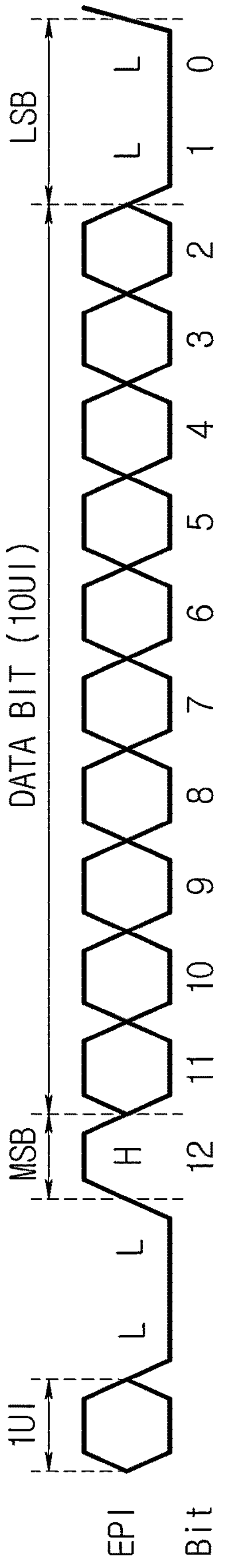
FIG. 7 is a view showing a data packet according to one example of the present disclosure.

FIG. 5 is a view showing signals transmitted or received between the timing controller and the data driver for an active period in the display device according to one example of the present disclosure. FIG. 6 is a view showing a transmission packet of the EPI clock according to one example of the present disclosure. FIG. 7 is a view showing a data transmission packet according to one example of the present disclosure.

Referring to FIG. 5, for the active period Active, the host system 2 outputs a data enable signal DE in a form of a pulse transitioned between logic high and logic low. The timing controller 10 performs an operation required for the active period Active in response to the data enable signal DE.

For a first period t1 of the active period Active, the timing controller 10 determines an optimal frequency of the EPI clock. Specifically, the timing controller 10 can determine a length of one horizontal period (1H) based on a pulse period of the data enable signal DE received for the first period t1. To this end, the first period t1 can include at least one pulse period of the data enable signal DE.

In addition, the timing controller 10 can determine the frequency of the EPI clock corresponding to the determined length of one horizontal period (1H). Specifically, the timing controller 10 can determine the frequency of the EPI clock at a high frequency when one horizontal period (1H) is relatively smaller, for example, when the driving frequency is high and determine the frequency of the EPI clock at a low frequency when one horizontal period (1H) is relatively larger, for example, when the driving frequency is low. As a result, the timing controller 10 increases the frequency of the EPI clock when the driving frequency increases and decreases the frequency of the EPI clock when the driving frequency decreases.

In one embodiment, the frequency of the EPI clock corresponding to the length of one horizontal period (1H) can be defined according to Equation 1 below.

$$Freq. = \frac{Num.\ \text{of Clock}}{1H\ \text{Time}(us)} \quad \text{[Equation 1]}$$

Here, Freq. denotes the frequency of the EPI clock, and Num. of Clock denotes the number of pulses of the EPI clock transmitted for one horizontal period (1H) for clock training.

According to Equation 1, when the length of one horizontal period (1H) is 1.8 us, the timing controller 10 can select the frequency of the EPI clock as 180 MHz. When the length of one horizontal period (1H) is 2.4 us, the timing controller 10 can select the frequency of the EPI clock as 135 MHZ. When the length of one horizontal period (1H) is 7.3 us, the timing controller 10 can select the frequency of the EPI clock as 44.38 MHZ. However, the present embodiment of the present disclosure is not limited thereto.

The EPI clock frequency corresponding to the length of one horizontal period (1H) can be connected in real time according to Equation 1 or the like, but in another embodiment, can be predetermined and stored in memory or the like. The timing controller 10 can load and select the frequency of the EPI clock corresponding to the determined length of the first horizontal period (1H) from the memory or the like.

The length of one horizontal period (1H) can be changed by the driving frequency (e.g., the refresh rate) controlled by the host system 2. Specifically, in the high-frequency driving, the length of one horizontal period (1H) can be relatively smaller, and in the low-frequency driving, the length of one horizontal period (1H) can be relatively larger.

Therefore, the timing controller 10 can determine the driving frequency controlled by the host system 2 according to the length of one horizontal period (1H) and change the frequency of the EPI clock in response to the determined driving frequency. Specifically, the timing controller 10 can select the frequency of the EPI clock as a high frequency in the high-frequency driving and select the frequency of the EPI clock as a low frequency in the low-frequency driving.

In order to newly establish a data link using the EPI clock with the changed frequency, the timing controller 10 and the data driver 30 can be in unlocked states. Therefore, the lock signal LOCK is output at a logic low level for a second period t2 of the active period Active.

For a third period t3 of the active period Active, the timing controller 10 transmits an EPI clock at the selected frequency to the data driver 30 as shown in FIG. 6. The EPI clock is transmitted by being processed in a form of a control packet according to the EPI protocol.

Referring to FIG. 6, one control packet can include a plurality of control bits. A transmission time of one control bit is 1 UI (unit interval), and a length thereof can be determined according to the resolution of the display panel 50 or the number of control bits included in one control packet.

The control bits are assigned to a logic value of "1 (or H)" in a logic high section of the EPI clock and assigned to a logic value of "0 (or L)" in a logic low section of the EPI clock. Values of the control bits can be changed depending on the variable frequency of the EPI clock. For example, when the frequency of the EPI clock is 180 MHz, the pulse period is 5.5 ns, and thus the control packet is assigned to "1" for a transmission time of 5.5/2 ns and "0" for the remaining transmission time of 5.5/2 nm. For example, when the frequency of the EPI clock is 135 MHz, the pulse period is 7.4 ns, and thus the control packet is assigned to "1" for a transmission time of 7.4/2 ns and "0" for the remaining transmission time of 7.4/2 nm. For example, when the frequency of the EPI clock is 44.38 MHz, the pulse period is 22.5 ns, and thus the control packet is assigned to "1" for a transmission time of 22.5/2 ns and "0" for the remaining transmission time of 22.5/2 nm.

The data driver 30 can generate an internal clock using the received EPI clock through an internal clock recovery circuit. When the phase and frequency of the internal clock are stably fixed, the data driver 30 can output the lock signal LOCK at a logic high level, and thus a data link for data transmission and reception between the timing controller 10 and the data driver 30 can be established.

When the data link is established, the timing controller 10 can transmit the control data CTR and the image data DATA to the data driver 30 for the fourth period t4 of the active period Active. The timing controller 10 processes the control data CTR and the image data DATA in a form of the data packet according to the EPI protocol and transmits the processed data to the data driver 30.

Referring to FIG. 7, one data packet includes a plurality of data bits and clock bits MSB and LSB assigned before and after the data bits. A transmission time of one data bit is 1 UI, and a length thereof can be determined according to the resolution of the display panel 50 or the number of data bits included in one control packet.

The clock bits MSB and LSB are assigned as much as 3 UI between data bits of neighboring data packets, and logic values thereof can be allocated as "0 0 1 (or L L H)." The number of data bits can be 10 bits as shown. However, the number of data bits and the length of clock bits MSB and LSB constituting one data packet are not limited thereto.

As described above, the display device 1 according to one embodiment of the present disclosure changes the frequency of the EPI clock in response to the length of one horizontal period (1H), which is changed depending on the driving frequency for the active period Active. Therefore, the EPI output and the internal clock of the data driver 30 can be changed in real time, and the power consumption of the timing controller 10 and the data driver 30 can be optimized.

Figure 8:
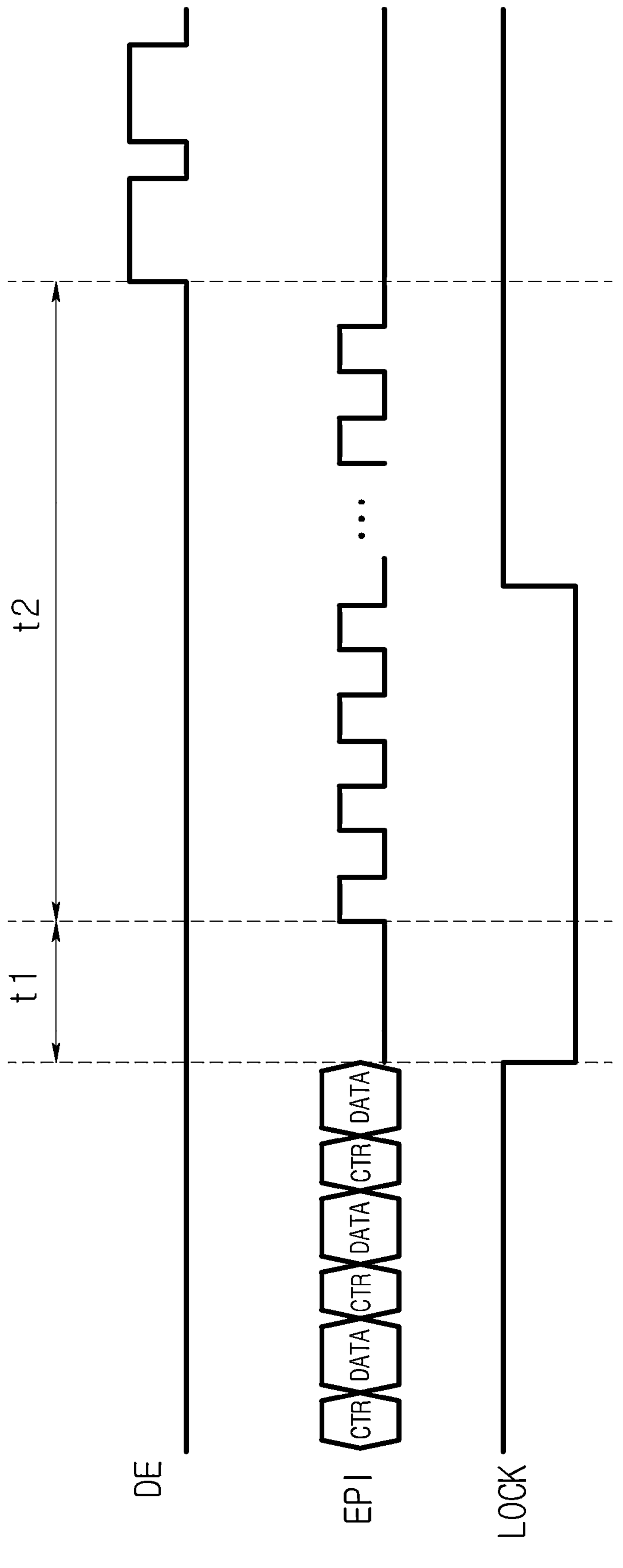
FIG. 8 is a view showing signals transmitted and received between the timing controller and the data driver for a vertical blank period according to one example of the present disclosure.

FIG. 8 is a view showing signals transmitted and received between the timing controller and the data driver for a vertical blank period according to one example of the present disclosure.

Referring to FIG. 8, for the vertical blank period VBlank, the host system 2 outputs the data enable signal DE at a logic low level. The timing controller 10 performs an operation required for the vertical blank period VBlank in response to the data enable signal DE.

For the vertical blank period VBlank, the timing controller 10 and the data driver 30 can transmit and receive the necessary control data CTR and/or image data DATA to sense the characteristic values of the pixels PX. For the sensing period, the timing controller 10 and the data driver 30 are in locked states, and the lock signal LOCK can be output at a logic high level.

In one embodiment, for the vertical blank period VBlank, the timing controller 10 and the data driver 30 can be in unlocked states to newly establish a data link by changing the frequency of the EPI clock. Therefore, for the first period t1 of the vertical blank period VBlank, the lock signal LOCK is output at a logic low level.

For the second period t2 of the vertical blank period VBlank, the timing controller 10 transmits the EPI clock with the changed frequency to the data driver 30. The EPI clock transmitted for the vertical blank period VBlank can be controlled at an ultra-low frequency. In other words, for the vertical blank period VBlank, the EPI clock is changed to a lower frequency than the EPI clock frequency transmitted for the active period Active and can be, for example, 38 MHz, but is not limited thereto.

The EPI clock is transmitted by being processed in a form of the control packet according to the EPI protocol. A structure of one control packet can be the same as that described with reference to FIG. 6.

For the vertical blank period VBlank, when the frequency of the EPI clock is controlled to 38 MHz, the pulse period is 2.6 ns, and thus the control packet can be assigned to "1" for the transmission time of 2.6/2 ns and assigned to "0" for the remaining transmission time of 2.6/2 nm.

As described above, the display device 1 according to one embodiment of the present disclosure controls the frequency of the EPI clock to an ultra-low frequency for the vertical blank period VBlank. A frequency of the internal clock of the data driver 30, which is generated based on the EPI clock, is also changed to the ultra-low frequency in response to the EPI clock.

Therefore, it is possible to minimize power consumption for the EPI output and the internal clock of the data driver 30 for the vertical blank period VBlank. In particular, in low-frequency driving in which the vertical blank period VBlank is prolonged, it is possible to further decrease the power consumption of the display device 1 by decreasing the frequency of the EPI clock for the vertical blank period VBlank to the ultra-low frequency.

Figure 9:
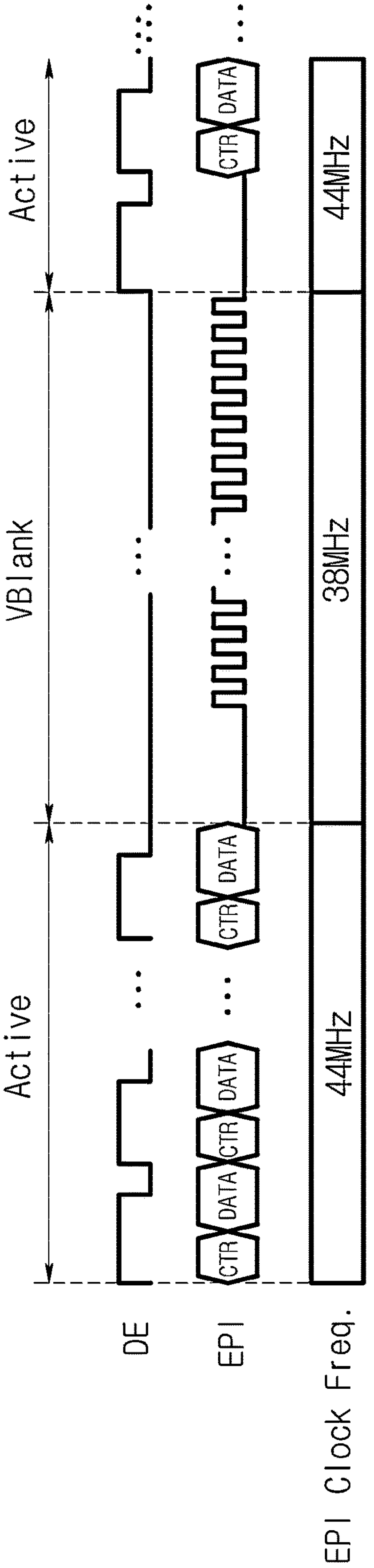
FIG. 9 is a view showing a low-power driving method of the display device according to one embodiment of the present disclosure.

FIG. 9 is a view showing a low-power driving method of the display device according to one embodiment of the present disclosure.

Referring to FIG. 9, the timing controller 10 of the display device 1 according to one embodiment of the present disclosure can operate for the active period Active in response to the pulse-shaped data enable signal DE transmitted from the host system 2. For the active period Active, the control data CTR and the image data DATA can be transmitted from the timing controller 10 to the data driver 30.

A driving frequency for the active period Active can be set by the data enable signal DE. In addition, for the active period Active, the frequency of the EPI clock can be controlled in response to the driving frequency. In one embodiment, the frequency of the EPI clock of the active period Active can be 44 MHz.

Thereafter, the timing controller 10 can operate for the vertical blank period VBlank in response to the data enable signal DE at a low level, which is transmitted from the host system 2. For the vertical blank period VBlank, the EPI clock at an ultra-low frequency can be transmitted from the timing controller 10 to the data driver 30. In one embodiment, the frequency of the EPI clock of the vertical blank period VBlank can be 38 MHZ.

Thereafter, the timing controller 10 can operate for the active period Active in response to the pulse-shaped data enable signal DE transmitted from the host system 2. For the active period Active, a data link between the timing controller 10 and the data driver 30 can be established, and the control data CTR and the image data DATA can be transmitted.

As shown in FIG. 9, the display device 1 according to one embodiment of the present disclosure controls the frequency of the EPI clock to be lower than that for the active period Active for the vertical blank period VBlank. Since power consumption is proportional to the square of the frequency as expressed in Equation 2 below, when the frequency is reduced to ½, the power consumption can be reduced to ¼.

$$P = C \times Freq^2 \qquad \text{[Equation 2]}$$

Here, P denotes the power consumption, C denotes a power constant, and Freq denotes the frequency of the EPI clock.

As described above, by controlling the frequency of the EPI clock to the ultra-low frequency, it is possible to minimize the power consumption for the EPI output and the internal clock of the data driver 30 for the vertical blank period VBlank. In particular, in low-frequency driving in which the vertical blank period VBlank is prolonged, it is possible to further decrease the power consumption of the display device 1 by decreasing the frequency of the EPI clock for the vertical blank period VBlank to the ultra-low frequency.

Figure 10:
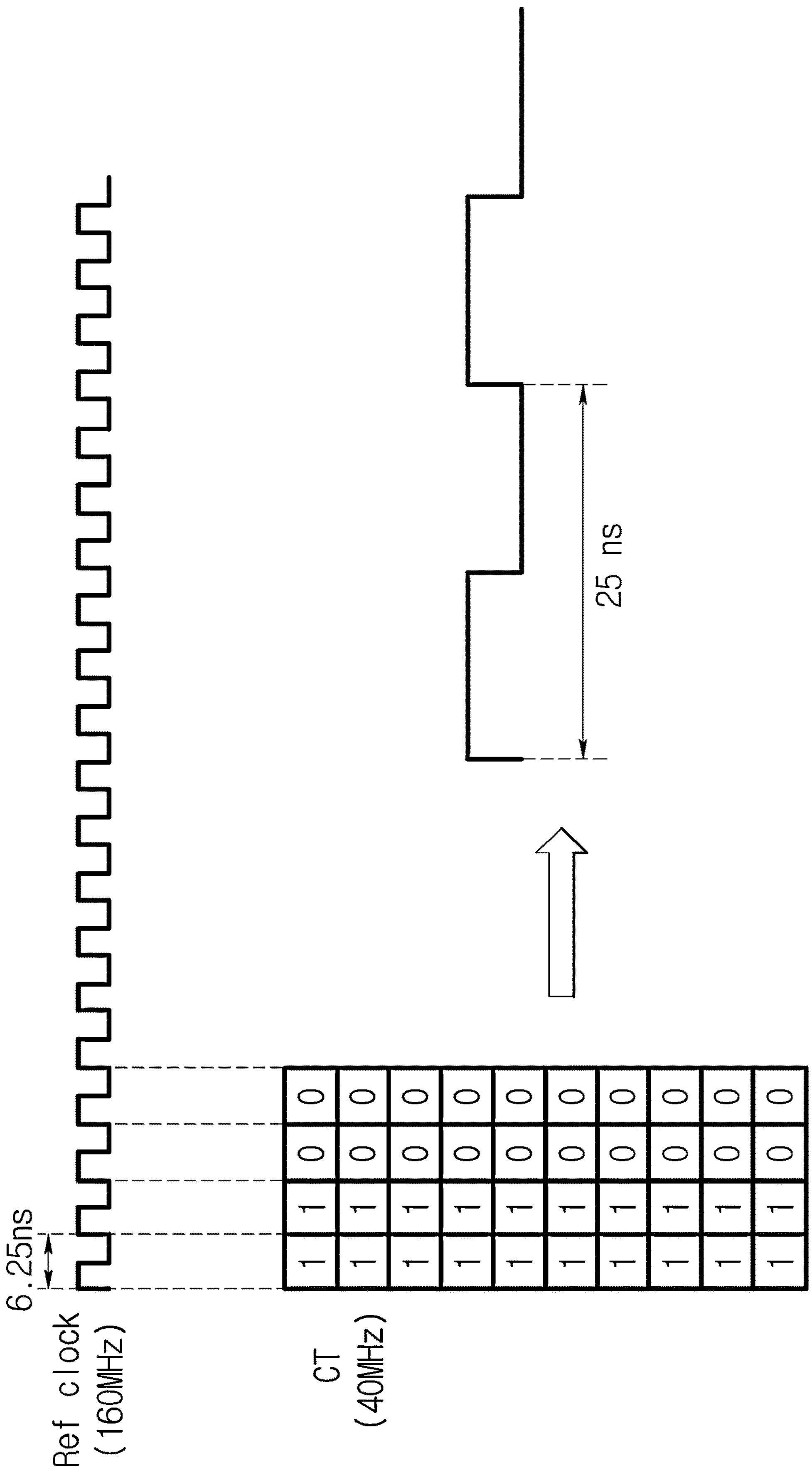
FIG. 10 is a view showing a method of changing a frequency of an embedded clock P-P interface (EPI) clock according to one embodiment of the present disclosure.

FIG. 10 is a view showing a method of changing a frequency of an EPI clock according to one embodiment of the present disclosure.

Referring to FIG. 10, the timing controller 10 can generate an EPI clock based on a reference clock Ref Clock. For example, the reference clock can be a pulse signal of 160 MHz with a pulse cycle of 6.25 ns.

The EPI clock can be generated by defining bit data which sets a logic level for each pulse cycle of the reference clock. Specifically, when a level of the EPI clock is generated at a logic high level in a first pulse cycle of the reference clock, "1" can be assigned to a first value of the bit data. When the level of the EPI clock is generated at a logic high level in a second pulse cycle of the reference clock, "1" can be assigned to a second value of the bit data.

When the level of the EPI clock is generated at a logic low level in a third pulse cycle of the reference clock, "0" can be assigned to a third value of the bit data. When the level of the EPI clock is generated at a logic low level in a fourth pulse cycle of the reference clock, "0" can be assigned to a fourth value of the bit data.

Based on the bit data defined as described above, the EPI pulse with a logic high level for two pulse cycles of the reference clock and a logic low level for the next two pulse cycles can be generated. The EPI pulse generated as described above has a pulse cycle of 25 ns, which is four times longer than the reference clock and a frequency of ¼ times, for example, is a pulse signal of 40 MHZ.

As described above, the timing controller 10 can generate the EPI pulse with the changed frequency by setting the bit value of the data bit in response to each pulse cycle of the reference clock and generating the EPI clock at the logic level corresponding to the set bit value. However, the method of controlling the frequency of the EPI pulse is not limited thereto.

Figure 11:
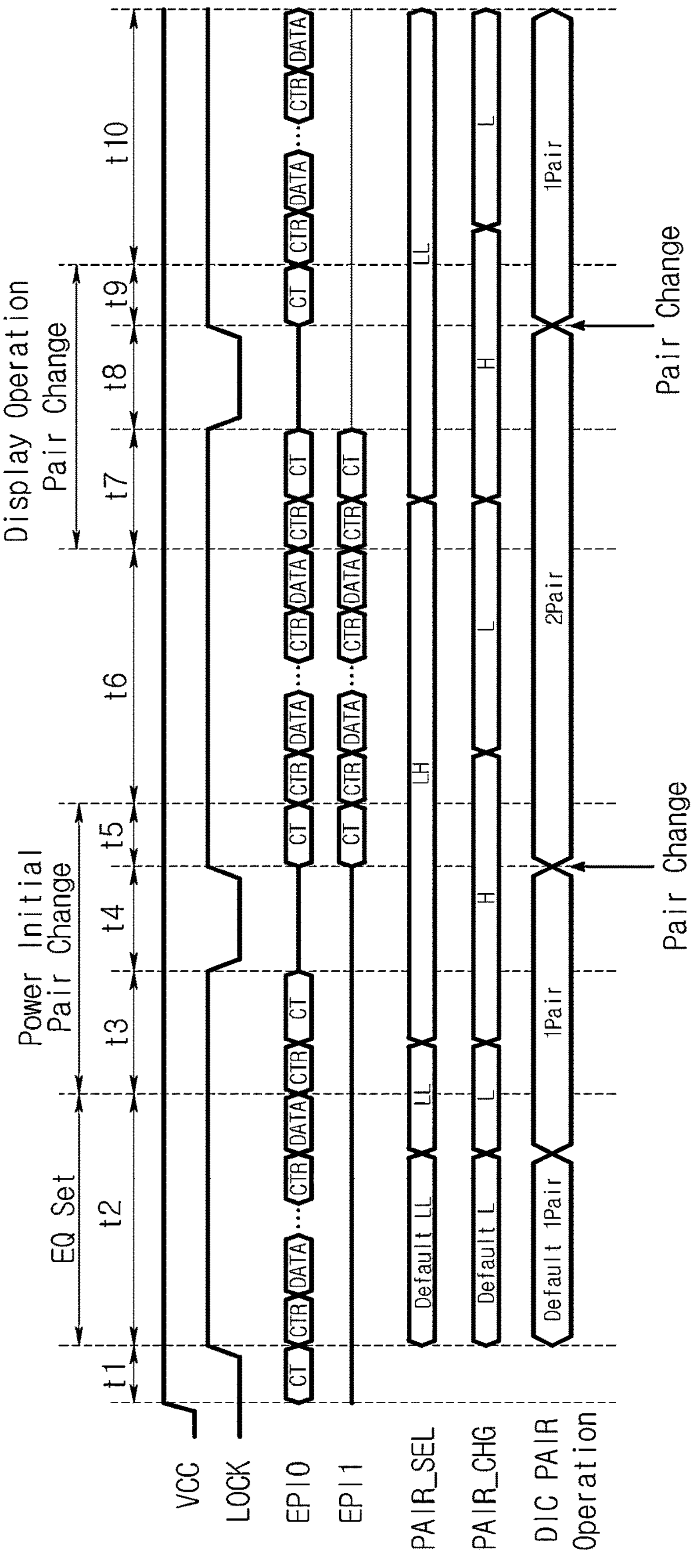
FIG. 11 is a view showing a method of changing a driving frequency and controlling an EPI pair option according to one embodiment of the present disclosure.

FIG. 11 is a view showing a method of changing a driving frequency and controlling an EPI pair option according to one embodiment of the present disclosure.

Referring to FIG. 11, when the display device 1 is turned on, power VCC for driving the timing controller 10 can be applied. Immediately after turned on, before the data link between the timing controller 10 and the data driver 30 is established, the lock signal LOCK is output at a logic low level.

For the first period t1, the timing controller 10 can transmit the clock training pattern CT through the first EPI line pair EPI0 connected to the data driver 30 in response to the lock signal LOCK at a logic low level. The data driver 30 establishes the data link with the timing controller 10 by generating the internal clock based on the clock training pattern CT and when the internal clock is stabilized, switching the lock signal LOCK to a logic high level.

When the data link is established, the timing controller 10 can transmit the control data CTR and the image data DATA to the data driver 30 for the second period t2. In one embodiment, an equalizer for boosting the input signal can be provided in the data driver 30. In the embodiment, the timing controller 10 can transmit the control data CTR and the image data DATA for setting the equalizing level (e.g., the boosting level) of the input signal of the data driver 30 to the data driver 30 for the second period t2. In one embodiment, the second period t2 can be 10 horizontal periods, but is not limited thereto.

Meanwhile, for the second period t2, the timing controller 10 and the data driver 30 can be set to defaults to transmit and receive the EPI data through one EPI line pair EPI0. A line pair selection signal PAIR_SEL and a line pair change signal PAIR_CHG can be output as values corresponding to default settings.

The line pair selection signal PAIR_SEL can be defined to instruct the number of EPI line pairs EPI0 and EPI1 through which the timing controller 10 and the data driver 30 transmit and receive the EPI data as 2 bit data. For example, when the timing controller 10 and the data driver 30 communicate through one EPI line pair EPI0 and EPI1, a logic value of the line pair selection signal PAIR_SEL can be set to “L L.” When the timing controller 10 and the data driver 30 communicate through two EPI line pairs EPI0 and EPI1, the logic value of the line pair selection signal PAIR_SEL can be set to “L H.” In other words, for the second period t2, the line pair selection signal PAIR_SEL can be output as “L L.”

The line pair change signal PAIR_CHG can be set to a logic high level to instruct a change in EPI line pairs EPI0 and EPI1 through which the timing controller 10 and the data driver 30 communicate with each other and when not changed, set to a logic low level. In other words, for the second period t2, the line pair change signal PAIR_CHG can be output at the logic low level.

Meanwhile, for the second period t2, a pair of line pair options DIC PAIR Operation inside the data driver 30 can be set to defaults to correspond to the line pair selection signal PAIR_SEL and the line pair change signal PARI_CHG.

In one embodiment, for the third period t3 of the power-on process, the driving frequency can be changed by the external host system 2 or the like. When the driving frequency is changed, as described above, the timing controller 10 can change the clock training pattern CT, for example, the frequency of the EPI clock to change the internal clock of the data driver 30.

In addition, when the driving frequency is changed, as described above with reference to FIG. 3, options (e.g., the number) of EPI line pairs EPI0 and EPI1 through which the timing controller 10 transmits the EPI data to the data driver 30 can be changed. In other words, the timing controller 10 can transmit the EPI clock with the changed frequency through one or two of the EPI line pairs EPI0 and EPI1 according to the driving frequency.

For example, in the high frequency driving, the timing controller 10 can transmit the EPI data to the data driver 30 through the first EPI line pair EPI0. In addition, in the low-frequency driving, the timing controller 10 can transmit the EPI data to the data driver 30 through the first and second EPI line pairs EPI0 and EPI1. In other words, in the low-frequency driving, the frequency of the data is low, but by increasing the number of line pairs which are the EPI transmission paths, the total amount of EPI data transmitted for the same time can be maintained.

To select the internal clock of the data driver 30 and the line pairs EPI0 and EPI1 to communicate, the timing controller 10 can switch the line pair selection signal PAIR_SEL to “L H” for the third period t3 and switch the line pair change signal PAIR_CHG to a logic high level.

Meanwhile, to select the internal clock of the data driver 30 and the EPI line pairs EPI0 and EPI1 to communicate, the data link between the timing controller 10 and the data driver 30 should be disconnected. To this end, the timing controller 10 can transmit the clock training pattern CT at a predetermined unlock frequency to the data driver 30 for the third period t3.

As the clock training pattern CT with the changed frequency is received instead of the image data DATA, the data link with the timing controller 10 can be disconnected, and the data driver 30 can be unlocked for the fourth period t4. The data driver 30 can switch the lock signal LOCK to a logic low level.

For the fourth period t4, the timing controller 10 can check whether the lock signal LOCK has been switched to the logic low level. To check the unlocked state, the fourth period t4 can be, for example, 32 us, but is not limited thereto.

For a fifth period t5, in response to the line pair selection signal PAIR_SEL and the line pair change signal PAIR_CHG, two pairs of line pair options DIC PAIR Operation inside the data driver 30 are set to correspond to the line pair selection signal PAIR_SEL and the line pair change signal PAIR_CHG. For the fifth period t5, the timing controller 10 communicates with the data driver 30 through the first and second EPI line pairs EPI0 and EPI1 connected to the data driver 30.

The timing controller 10 checking the logic low level of the lock signal LOCK can transmit the clock training pattern CT with the changed frequency to the data driver 30 in response to the driving frequency changed for the fifth period t5. At this time, the timing controller 10 can transmit the clock training pattern CT through the changed number of EPI line pairs EPI0 and EPI1. The data driver 30 establishes the data link with the timing controller 10 by re-generating the internal clock based on the changed clock training pattern CT and when the internal clock is stabilized, switching the lock signal LOCK to a logic high level.

To re-establish the data link, the fifth period t5 can be, for example, 200 us, but is not limited thereto.

When the data link is established, for a sixth period t6, the timing controller 10 can transmit the control data CTR and the image data DATA for display driving to the data driver 30 through the changed number of EPI line pairs EPI0 and EPI1. For example, the timing controller 10 can transmit image data DATA in a first frame to the data driver 30. For the sixth period t6, the line pair selection signal PAIR_SEL can be maintained at “L H,” and the line pair change signal PAIR_CHG can be switched to a logic low level.

In one embodiment, for a seventh period t7 of the display driving, the driving frequency can be changed by the external host system 2 or the like. In response to a change in driving frequency, the timing controller 10 can change the internal clock of the data driver 30 and the number of line pairs EPI0 and EPI1.

To this end, for the seventh period t7, the timing controller 10 can switch the line pair selection signal PAIR_SEL to “L L” and switch the line pair change signal PAIR_CHG to a logic high level. In addition, the timing controller 10 can transmit the clock training pattern CT at a predetermined unlock frequency to the data driver 30 to disconnect the data link between the timing controller 10 and the data driver 30.

In response to the clock training pattern CT, for an eight period t8, the data driver 30 can be unlocked, and the lock signal LOCK can be switched to a logic low level. For the eight period t8, the timing controller 10 can check whether the lock signal LOCK has been switched to the logic low level.

For a ninth period t9, in response to the line pair selection signal PAIR_SEL and the line pair change signal PAIR_CHG, a pair of line pair options DIC PAIR Operation inside the data driver 30 are set to correspond to the line pair selection signal PAIR_SEL and the line pair change signal PAIR_CHG. For the ninth period t9, the timing controller 10 communicates with the data driver 30 through the first EPI line pair EPI0 connected to the data driver 30.

The timing controller 10 checking the logic low level of the lock signal LOCK can transmit the clock training pattern CT with the changed frequency to the data driver 30 in response to the driving frequency changed for the ninth period t9. The data driver 30 establishes the data link with the timing controller 10 by re-generating the internal clock based on the changed clock training pattern CT and when the internal clock is stabilized, switching the lock signal LOCK to a logic high level.

When the data link is established, the timing controller 10 can transmit the control data CTR and the image data DATA to the data driver 30 for display driving for a tenth period t10. For the tenth period t10, the line pair selection signal PAIR_SEL can be maintained at "L L," and the line pair change signal PAIR_CHG can be switched to a logic low level.

According to the display device and the method of driving the same according to the embodiments of the present disclosure, it is possible to optimize the power consumption for the EPI output in real time upon driven in the variable refresh rate mode.

According to the display device and the method of driving the same according to the embodiments of the present disclosure, it is possible to reduce the power consumption through the low-power driving upon operating at the ultra-low frequency.

Although the embodiments of the present disclosure have been described above with reference to the accompanying drawings, those skilled in the art to which the present disclosure pertains will be able to understand that the above-described technical configuration of the present disclosure can be carried out in other specific forms without changing the technical spirit or essential features thereof. Therefore, it should be understood that the above-described embodiments are illustrative and not restrictive in all respects. In addition, the scope of the present disclosure is described by the claims to be described below rather than the detailed description. In addition, the meaning and scope of the claims and all changed or modified forms derived from the equivalent concept should be construed as being included in the scope of the present disclosure.

What is claimed is:

1. A display device comprising:

a display panel including pixels disposed therein;

a timing controller configured to output an embedded clock P-P interface (EPI) data including an EPI clock, control data, and image data through one or more EPI line pairs; and a data driver connected to the timing controller through the one or more EPI line pairs between the timing controller and the data driver, the data driver being configured to generate an internal clock based on the EPI clock, process the control data and the image data, and supply data voltages to the pixels, wherein the timing controller changes a frequency of the EPI clock according to a driving frequency controlled by a host system, and wherein the timing controller is configured to increase a number of EPI line pairs used for data transmission between the timing controller and the data driver when the driving frequency decreases, and decrease the number of the EPI line pairs used for the data transmission between the timing controller and the data driver when the driving frequency increases.

2. The display device of claim 1, wherein the timing controller increases the frequency of the EPI clock when the driving frequency increases, and decreases the frequency of the EPI clock when the driving frequency decreases.

3. The display device of claim 1, wherein the timing controller changes the frequency of the EPI clock to be lower than a frequency for an active period in one frame for a vertical blank period in the one frame.

4. The display device of claim 3, wherein, for the active period, the timing controller determines a length of one horizontal period based on a pulse cycle of a data enable signal transmitted from the host system, determines the frequency of the EPI clock to correspond to a length of the one horizontal period, and transmits the determined frequency of the EPI clock to the data driver.

5. The display device of claim 4, wherein, for the vertical blank period, the timing controller transmits the EPI clock at an ultra-low frequency being lower than the determined frequency for the active period, to the data driver.

6. The display device of claim 3, wherein the timing controller sets a bit value of a data bit to correspond to a pulse period of each of a reference clock, and changes the frequency of the EPI clock by generating the EPI clock at a logic level corresponding to the set bit value.

7. The display device of claim 1, wherein the one or more EPI line pairs include a first EPI line pair and a second EPI line pair, and the timing controller changes the number of EPI line pairs configured to transmit the EPI data to the data driver according to the driving frequency.

8. The display device of claim 7, wherein the timing controller transmits the EPI clock at a predetermined unlock frequency to the data driver when the driving frequency is changed, and transmits the EPI data through the selected number of EPI line pairs according to the driving frequency when receiving a lock signal at a logic low level from the data driver.

9. The display device of claim 8, wherein, when the driving frequency is changed, the timing controller transmits a line pair selection signal for instructing the number of EPI line pairs and a line pair change signal for instructing a change in EPI line pair, to the data driver, and the data driver sets line pair options based on the line pair selection signal and the line pair change signal.

10. The display device of claim 9, wherein the line pair selection signal is defined to instruct the number of EPI line pairs through which the timing controller and the data driver transmit and receive the EPI data as 2 bit data.

11. The display device of claim 9, wherein the line pair change signal is switched to a logic high level when the number of EPI line pairs is changed.

12. A method of driving a display device including a timing controller and a data driver connected through one or more embedded clock P-P interface (EPI) line pairs, the method comprising:

determining, by the timing controller, a length of one horizontal period based on a pulse cycle of a data enable signal transmitted from a host system for an active period in one frame;

changing a frequency of an EPI clock to correspond to the length of the one horizontal period;

transmitting the EPI clock of the changed frequency to the data driver;

generating, by the data driver, an internal clock based on the EPI clock;

increasing, by the timing controller, a number of EPI line pairs used for data transmission between the timing controller and the data driver when the driving frequency decreases; and decreasing, by the timing controller, the number of the EPI line pairs used for the data transmission between the timing controller and the data driver when the driving frequency increases.

13. The method of claim 12, wherein, when the length of the one horizontal period increases, the frequency of the EPI clock decreases, and when the length of the one horizontal period decreases, the frequency of the EPI clock increases.

14. The method of claim 12, further comprising:

generating the EPI clock having an ultra-low frequency being lower than a frequency for the active period for a vertical blank period in the one frame; and transmitting the EPI clock having the ultra-low frequency to the data driver.

15. The method of claim 12, wherein the changing of the frequency of the EPI clock includes:

setting a bit value of a data bit to correspond to a pulse cycle of each of a reference clock; and generating the EPI clock of a logic level corresponding to the set bit value.

16. The method of claim 12, wherein the one or more EPI line pairs include a first EPI line pair and a second EPI line pair, and the changing of the frequency of the EPI clock includes changing the number of EPI line pairs configured to transmit EPI data to the data driver according to a length of the one horizontal period.

17. The method of claim 16, wherein, when the length of the one horizontal period increases, the number of EPI line pairs increases, and when the length of the one horizontal period decreases, the number of EPI line pairs decreases.

18. The method of claim 16, wherein the changing of the number of EPI line pairs includes:

transmitting, by the timing controller, the EPI clock having a predetermined unlock frequency to the data driver;

transmitting, by the data driver, a lock signal having a logic low level to the timing controller in response to the EPI clock; and transmitting, by the timing controller, the EPI data to the data driver through the number of EPI line pairs selected according to the driving frequency when the lock signal having the logic low level is confirmed.

* * * * *